United States Patent [19]
El-Hag et al.

[11] 4,386,559
[45] Jun. 7, 1983

[54] APPARATUS FOR CONTINUOUS PREPARATION OF RECONSTITUTABLE BATTER-COATED COMESTIBLES

[75] Inventors: Nabil A. El-Hag, Peekskill; Gary T. Dulin, Tarrytown; Todd J. Krasnow, White Plains, all of N.Y.

[73] Assignee: General Foods Corporation, White Plains, N.Y.

[21] Appl. No.: 214,597

[22] Filed: Dec. 9, 1980

[51] Int. Cl.³ ............................................. A47J 37/12
[52] U.S. Cl. ...................................... 99/404; 99/407; 426/438
[58] Field of Search ............. 99/404, 405, 407, 443 C; 426/438, 439, 94, 95, 391, 502

[56] References Cited

U.S. PATENT DOCUMENTS

| | | | |
|---|---|---|---|
| 1,599,916 | 9/1926 | Nye | 99/405 |
| 2,546,163 | 3/1951 | McBeth | 99/404 |
| 3,635,149 | 1/1972 | Smith | 99/404 |
| 3,731,614 | 5/1973 | Smith et al. | 99/404 |
| 3,733,202 | 5/1973 | Marmor | 99/404 X |
| 4,187,771 | 2/1980 | Westover et al. | 99/404 |
| 4,308,286 | 12/1981 | Anstett | 99/404 X |

OTHER PUBLICATIONS

"MMF Fish & Chip Battered Fish" Modern Maid Food Products, Inc. (1978).

Primary Examiner—Billy J. Wilhite
Attorney, Agent, or Firm—Joyce P. Hill; Thomas R. Savoie; Daniel J. Donovan

[57] ABSTRACT

An apparatus and method is disclosed for continuously preparing a partially-fried, batter-coated, frozen comestible product, such as a fish filet, having a novel ridged batter topography. The apparatus has an infeed conveyor belt with support elements and a means for providing a hot cooking oil bath that is maintained at a level that does not exceed ½ inch above the top of a batter-coated comestible resting on the support elements. Preferably, the hot oil does not cover the top of the comestible placed on the support elements. The support elements of the infeed conveyor belt have a defined size and spacing which provides a controlled physical environment to support a batter-coated comestible in the hot cooking oil bath while batter begins to droop from the comestible and is irreversibly heat-set in a desired ridged topography. After the ridged batter topography is formed, the comestible is transported deeper into the hot cooking oil bath to completely heat-set the batter-coating.

5 Claims, 4 Drawing Figures

APPARATUS FOR CONTINUOUS PREPARATION OF RECONSTITUTABLE BATTER-COATED COMESTIBLES

BACKGROUND OF THE INVENTION

1. Field of the Invention

The present invention relates generally to an improved continuous frying apparatus with a hot cooking oil bath for producing batter-coated, frozen food products having a ridged batter topography. More particularly, the subject invention relates to an infeed, conveyor belt arrangement in a continuous fryer for preparing partially-fried, batter-coated, frozen comestible products which after oven reconstitution are organoleptically similar or superior, in texture and appearance, to fat-fried, batter-coated comestible products.

For purposes of the present application, the term "fat-fried" refers to french-fried, deep fat-fried or pan-fried products. The term "battered" refers to batter-coated, e.g., a fluid coating of a flour-based mixture applied to enhance the taste and attractiveness of fat-fried foods.

The present invention is particularly described with respect to frozen fish products, such as fish portions, filets or sticks, but it should be apparent to those skilled in the art that the teachings herein have other applications; for instance, to the preparation of partially-fried frozen meat, poultry and vegetable products which are oven reconstitutable to resemble fat-fried products.

2. Discussion of the Prior Art

Many different types of arrangements are known in the prior art to process comestible products in a hot cooking oil bath, including, for example, those disclosed by McBeth U.S. Pat. No. 2,546,163; Smith et al U.S. Pat. No. 3,731,614; Marmor U.S. Pat. No. 3,733,202; and Westover et al U.S. Pat. No. 4,187,771.

McBeth (U.S. Pat. No. 2,546,163) describes a food cooking apparatus having a receptacle for cooking oil and foodstuffs heated by a plurality of heat tubes and a baffle means for preventing food fragments and other sediments from settling on the heat tubes. An endless conveyor belt transports the foodstuffs through the cooking oil at variable speeds.

Smith et al (U.S. Pat. No. 3,731,614) describe the use of spaced heating zones to eject heated fluid onto a food product being moved at a controlled rate along a trough containing a heated, circulating liquid to permit control of temperature and heat transfer during a continuous cooking process.

Marmor (U.S. Pat. No. 3,733,202) describes a deep fat fryer designed to remove fat degradation products. FIG. 1 shows a two-part conveyor belt having a plurality of spaced carrier lugs.

Each of the above patents discloses arrangements requiring the initial and complete submersion of a food product in a hot oil bath. No mention is made of the usefulness of forming a ridged batter topography.

Westover et al (U.S. Pat. No. 4,187,771) describe a frying apparatus which includes a fat holding tank and a transfer conveyor such that the product expands or bulges up into openings in the conveyor belt, thereby securely engaging the food product and transporting it through the fat. It is noted that an irregularly shaped surface is formed using the disclosed frying apparatus.

In a 1978 trade publication, "MMF Fish and Chip Battered Fish," Modern Maid Food Products, Inc. describes the use of a continuous fryer that is specially designed for frying battered products. The publication teaches that the formation of ridges will vary depending on the type of drop plate used in the processor's continuous fryer.

It would be desirable to have a continuous fryer which consistently and expeditiously prepares partially-fried, batter-coated, frozen comestible products having a ridged batter topography such that after oven reconstitution, the food products are organoleptically similar or superior, in texture and appearance, to batter-coated, fat-fried comestible products.

SUMMARY OF THE INVENTION

A primary object of the present invention is to provide an arrangement for preparing a partially-fried, batter-coated, frozen comestible product having a ridged batter topography which, through oven reconstitution, produces a product organoleptically similar or superior, in texture and appearance, to its fat-fried, fast food counterpart, and which product is highly preferred by consumers over presently-available oven-reconstituted counterparts.

A further significant object of the present invention is the provision of an arrangement to produce a comestible product having an irregular ridged batter topography. An irregular batter topography provides a product having a tempting and attractive aesthetic appearance, and also increases the surface area of the batter coating which facilitates a more efficient heat transfer to the resultant product during oven reconstitution. Further, the oven reconstituted comestible is crisper on the outside, more moist within, and does not encounter significant problems with a soggy crust.

Another object of the present invention is to provide an arrangement for the preparation of a batter-coated, frozen comestible which has a relatively homogeneous coating composition, maintains an irregular surface area, even during frying, and also does not require turning during reconstitution, such as in an oven.

Accordingly, the present invention is directed to an apparatus and a continuous method for using said apparatus to prepare a frozen battered comestible product having irregular, ridged batter topography. The apparatus has a means for providing a hot cooking oil bath to at least partially heat-set a batter coating on a comestible product and an infeed conveyor belt extending into the hot cooking oil bath. The infeed conveyor belt has support elements having a defined size and spacing. Each element has a diameter of from about 0.6 to 2.2 centimeters (cms) [¼ to ⅞ inches] and is positioned such that the spatial arrangement of the support elements is such that the individual elements are from an adjacent position up to a distance of 3.8 cms (1½ in.) between each element. The hot cooking oil is maintained at a level of from about 0.6 to 2.5 cms (¼ to 1 inch) above the top of the support elements. For example, the distance from the top of the support elements to the surface of the oil can range between ¼ inch to 1.0 inch. Furthermore, in a preferred embodiment, when preparing a 3-ounce (85 grams) batter-coated fish filet having a thickness of 9/16 in. (1.1 cm), the hot cooking oil is 1.3 cms (½ inch) above the top of the support elements, each support element has a bar diameter of 1.5 cms (⅝ inch) and the support elements are spaced 1.9 cms (¾ in.) apart. This arrangement heat-sets the batter on the bottom and sides of the comestible while it is supported by the spaced support elements, and also prevents the batter-coated comestible from floating off the support elements while the batter begins to droop from the comestible and is heat-set thereon.

After the batter on the bottom and sides is heat-set, the comestible is transported deeper into the hot cooking oil bath to completely heat-set the top thereof. The means for the further transport of the batter-coated comestible can be a second conveyor belt arrangement which includes a bottom conveyor belt to convey the products deeper into the hot cooking oil bath to heat-set the tops thereof, and a top submerger conveyor belt beneath which the battered products are conveyed to prevent the products from floating to the surface of the hot cooking oil bath.

It is also contemplated that the infeed conveyor belt and hot cooking oil arrangement be used as an integral part of an endless conveyor belt in a continuous fryer or as the initial segment of a conventional deep-fat fryer having a plurality of conveyor belt configurations.

BRIEF DESCRIPTION OF THE DRAWINGS

The foregoing and other objects and advantages of the novel apparatus for preparing a frozen, partially-fried, batter-coated comestible product pursuant to the teachings of the present invention may be more readily understood by one skilled in the art with reference to the following detailed description of several embodiments thereof, taken in conjunction with the accompanying drawings wherein identical reference numerals refer to like elements throughout the several views, and in which.

DETAILED DESCRIPTION OF THE DRAWINGS

Figure 1:
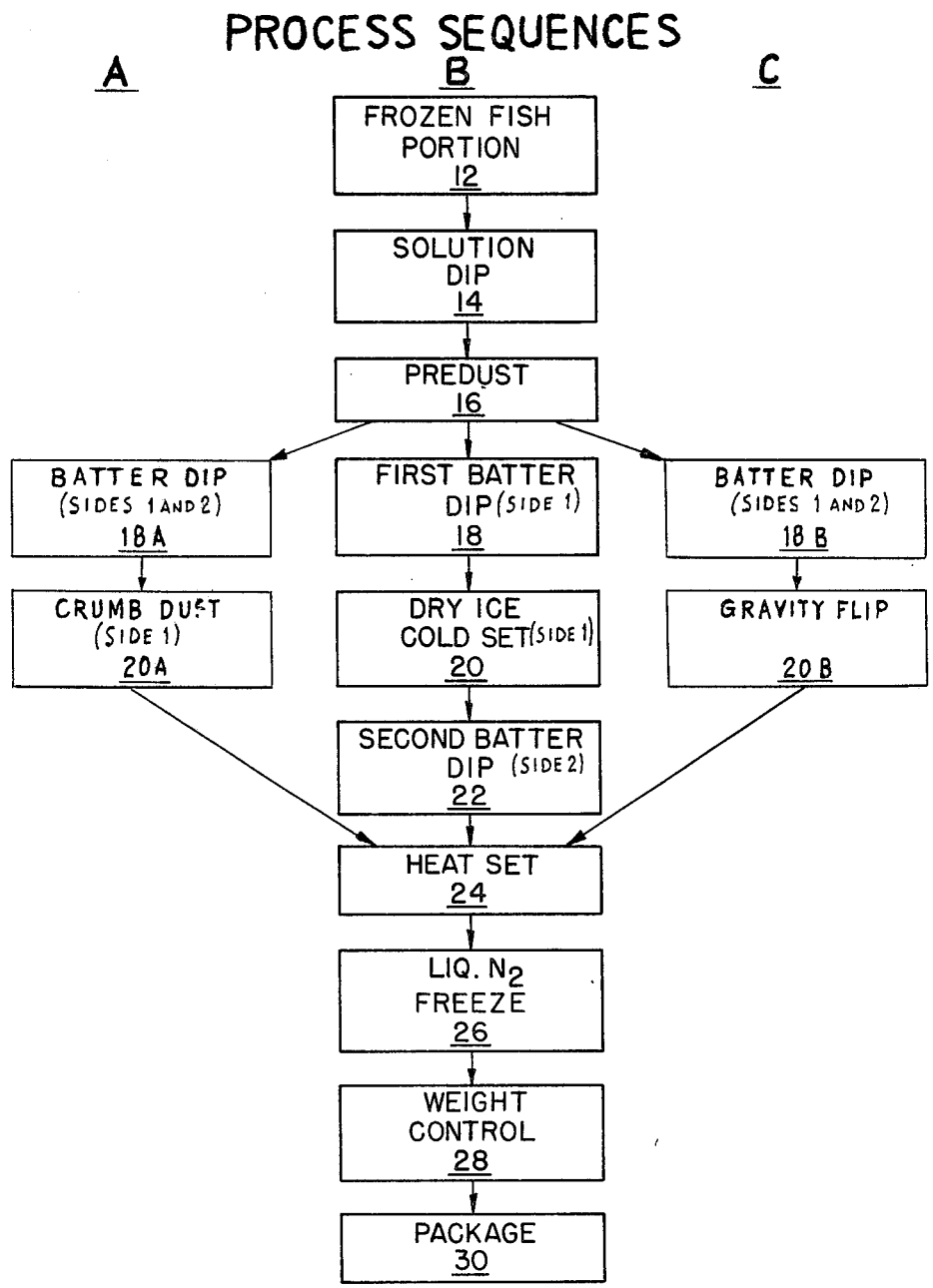
FIG. 1 illustrates the sequence of steps involved in a complete implementation of a process for preparing a frozen comestible product.

Referring to the drawings in detail, FIG. 1 illustrates the sequence of steps involved in a complete implementation of a process for preparing a reconstitutable frozen comestible. A frozen fish portion or filet 12 is initially dipped at 14 in a wetting solution in a conventional manner. The product is then predusted at 16 in a conventional manner with a flour-based powder which assists the surface of the product to adhere to batter later applied thereto. It is within the skill of the art to adjust both batter composition and batter viscosity to achieve desirable variations in flavor and aesthetic appearance of the batter-coated comestible.

In alternate method A, the dusted fish portion is completely enrobed in a conventional liquid/flour/starch batter mix at 18A. The top side (side 1) is positioned upright to receive a dry particulate sprinkling of bread crumbs at 20A using standard breading application equipment.

Alternate method B, the top (side 1) and side edges of the frozen fish are then dipped at 18 in a suitable flour/starch batter. The batter coating is then cold-set on the comestible product at 20, as by the application of carbon dioxide snow to the batter surface. Batter is then applied to the bottom (side 2) of the comestible product.

In alternate method C, the dusted fish portion is completely enrobed in a suitable flour/starch batter at 18B. The top side (side 1) comes out of the batter with a greater amount of batter than the bottom side (side 2). The fish portion is flipped at 20B so that side 1 is the first side to come in contact with the hot oil bath.

The batter-coated, frozen comestible treated in the manner described above, or with any other known batter-coating technique is then heat-set at 24 by treatment in a hot cooking oil bath in a manner described in greater detail, infra. The product is then quick-frozen at 26 such that the core temperature reaches $-1.0°$ C. to $-25°$ C. within about 1 hour, divided according to weight at 28, and packaged at 30 for shipment in commerce.

Figure 2:
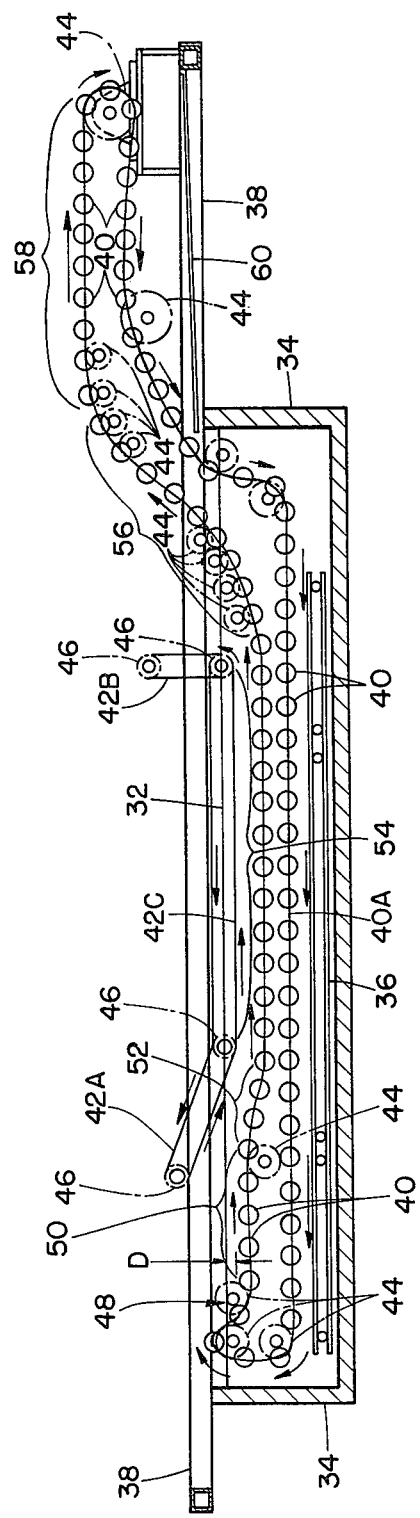
FIG. 2 is a schematic elevational view of a first embodiment of apparatus for heat-setting the batter on a comestible product.
Figure 4:
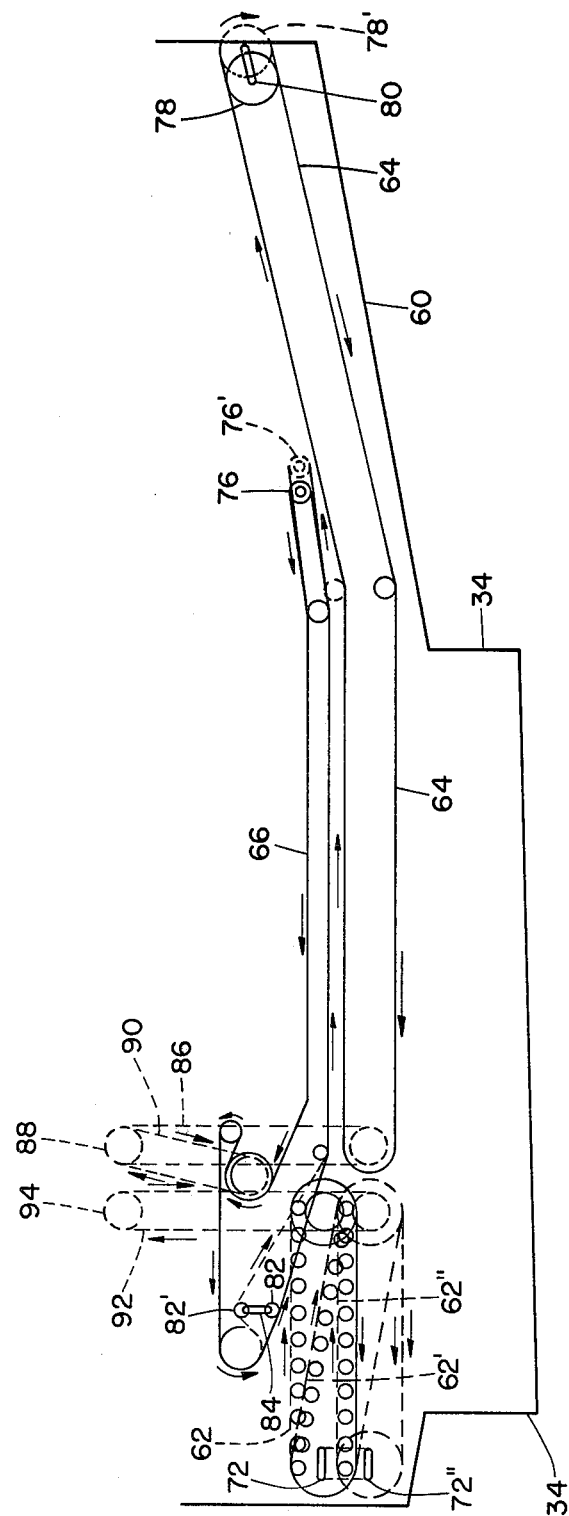
FIG. 4 illustrates a schematic elevational view of a second embodiment of apparatus for heat-setting the batter on a comestible product.

FIGS. 2 and 4 are schematic elevational views of first and second embodiments of apparatus useful in performing the heat-setting operation of step 24 in a hot cooking oil bath. Each of these embodiments provides an apparatus for preparing a battered comestible product having a ridged batter topography in which the battered comestible, having the batter freshly applied and dripping from the bottom, is supported on spaced support elements while being subjected to a hot cooking oil bath. The bottom of the comestible is immersed in the hot cooking oil bath, where, as a result of gravity, the batter begins to droop from the comestible and into the openings between the support elements. As the batter begins to droop, it is heat-set in that position, thereby producing a ridged batter topography on the comestible. Furthermore, in each disclosed embodiment the process is carried out on a conveyor belt formed by spaced support elements on which the battered comestible is conveyed into a hot cooking oil bath wherein the oil level is such that it does not permit the battered comestible to float off the conveyor belt. In the preferred embodiment, the top surface of the comestible is not submerged in the oil bath. However, it is within the scope of the invention to have the oil slightly over the top surface of the comestible. It is critical that the oil does not exceed $\frac{1}{2}$ inch above the top of the comestible, as such the top surface is not completely heat-set during the formation of a ridged topography on the bottom surface. This arrangement permits the batter-coated comestible to rest on the spaced support elements while the batter begins to droop and is heat-set thereon. The oil level is such that the bouyancy resulting therefrom does not overcome the gravitational forces holding the comestible against the support.

After the batter on the comestible is heat-set so that the drooping batter forms irregularly shaped ridges, the product is then transported deeper into the hot cooking oil bath to completely heat-set the batter thereon. In this regard, one embodiment includes a submerger conveyor belt beneath which the battered products are conveyed to prevent the products from floating to the surface of the hot cooking oil bath.

It should be noted that the batter-coated comestible will, due to a relatively high moisture content, typically be of sufficient density to sink in an oil bath; however, as moisture is removed from the battered comestible, it will float in the oil bath. According to this invention, the comestible is maintained in a partially submerged state during an initial period wherein the density of the comestible is greater than that of the oil and also during a subsequent period wherein the density of the comestible is less than that of the oil.

Figure 3:
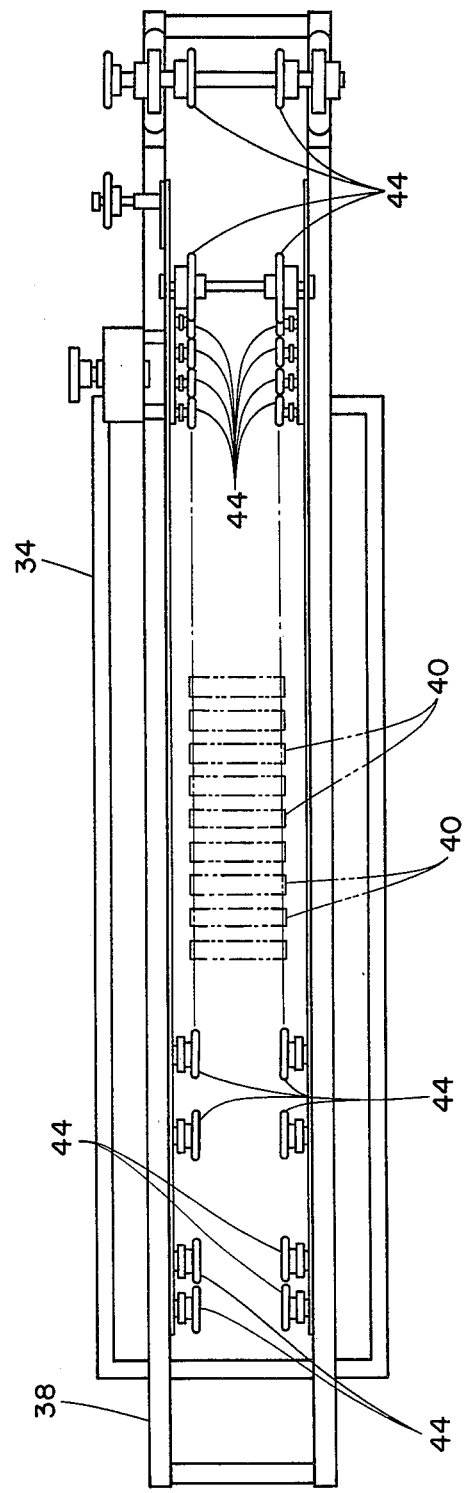
FIG. 3 is a plan view of the apparatus of FIG. 2.

Referring to the embodiment illustrated in FIGS. 2 and 3 in greater detail, a hot cooking oil bath is maintained at a level 32 within an oil tank 34 having a commercially-available heater 36 therein. As is customary in the art, the heater is preferably thermostatically controlled. A conveyor belt frame 38 is supported on top of the oil tank and provides, with the frame of tank 34, support for a first endless conveyor belt formed by a plurality of spaced roller elements 40 linked together at their opposite ends by endless chain elements 40A and a second endless conveyor belt arrangement consisting of first and second belt portions 42A and 42B connected at the opposite ends of belt run 42C. The first endless conveyor belt has its travel path defined by a plurality of guide rollers 44 spaced along its length at pivotal travel points and rotatably journaled in frame 38, with the chains 40A being guided by the rollers 44, while the travel path for the second conveyor belt is similarly defined by a plurality of guide rollers 46 which guide belts 42A and and 42B and are also rotatably journaled in frame 38.

According to this invention, cylindrical support elements or rods are used to obtain a desired ridged topography for the particular type of comestible being processed. This is believed to be a novel use of an infeed belt of a continuous fryer. It has been found that the diameter of the rods must be between 0.60 and 2.2 cms ($\frac{1}{4}$ to $\frac{7}{8}$ inches) for battered fish portions of from 20 to 90 gram sizes. The support rods must be spatially arranged from an adjacent position up to a distance of 3.8 cms apart, and, in general, the distance between rods is chosen such that a desired amount of batter droops or drips to form ridges. Further, the support rods can be either stationary or freely rotating. As will become apparent to those skilled in the art, the ridged batter topography is a function of rod spacing, rod size and oil height. The narrower spacing will be used for larger diameter support rods and wider spacing will be used in conjunction with small diameter rods. The oil height will vary with the thickness of the comestible that must rest on the rods during the formation of the ridged topography. When practicing this invention with the apparatus and method disclosed herein, it is possible to simultaneously effect a physical and chemical modification of the batter. As the smooth batter coating droops over the support elements, there is a physical change from a smooth continuous surface to a ridged topography. As the batter changes from a liquid to a solid by the application of heat, the liquid is irreversibly set or crosslinked as in a chemical reaction.

The operation of the apparatus is as follows:

the battered and partially frozen fish portions are initially deposited, liquid batter side down, on the left portion of the belt 50, and are transported thereby to the right as illustrated in FIG. 2. The batter on the bottom and sides of the comestible is now in the hot oil bath to a depth D below the surface thereof. The fish portions then travel along a relatively horizontal section 50 of the conveyor belt and as the belt moves the comestibles to the right, the batter begins to droop therefrom beneath the top surface of the spaced roller elements 40. The temperature of the hot oil bath and the speed of the conveyor belt are selected such that the batter is heat-set in place as it begins to droop, and prior to being further submerged in the hot oil bath by a second downwardly inclined section 52. The depth D between the surface of the hot oil bath and the top of the support elements in the relatively horizontal section 50 of the conveyor belt will be approximately 0.6 cm ($\frac{1}{4}$ inch) to 2.5 cm (1 inch), preferably about 1.3 cm ($\frac{1}{2}$ inch) such that the oil level does not interfere with the gravitational forces holding the comestible on the support elements. This arrangement heat-sets the batter so that a ridged topography forms on the comestible while it is supported by the spaced roller elements, while preventing the battered comestible from floating off the rollers 40.

After the dripping batter is heat-set to form irregularly-shaped ridges on the comestible product, the second downwardly-inclined portion 52 transports the comestible deeper into the hot oil bath. The comestible would normally float at this location, but is prevented from doing so and is submerged in the hot cooking oil bath by being held therein through the lower run of the first belt portion 42A of the second, top submerger conveyor belt arrangement, which belt portion 42A may consist of a belt structure allowing the oil to circulate therethrough. The lower section of the top submerger belt then transports the comestible through the bath along a run 54 for a sufficient duration of time to completely heat-set all of the batter thereon.

In general, it is desirable to cook the inner fish portion as little as possible in the practice of the present invention as that results in a longer shelf-life for the resultant commercial product. The immersion of the battered comestible in the hot oil bath is primarily to heat-set the batter thereon rather than to cook the inner fish portion thereof.

After the entire batter on the comestible product is completely heat-set, the movement of the product is timed to reach the right side of run 54, and the product then floats to the surface of the bath as it travels further to the right. The first, lower conveyor belt thereupon picks up the product and transports it up an upwardly-inclined portion 56 to remove the comestible from the oil bath and halt further heat treatment thereof. The comestible then reaches a top horizontal run 58 of the bottom conveyor belt, from which it is removed, and is then quick-frozen and packaged for the commercial market. A plate 60 is positioned beneath a portion of upwardly-inclined section 56 and horizontal run 58 to catch cooking oil dripping from the comestible, and is inclined to direct the cooking oil back into the main portion of the bath.

In the embodiment of FIGS. 2 and 3, the first and second conveyor belts may be driven in a conventional manner independently of each other, or may be driven by a common drive motor such that the movements of the conveyor belts are synchronized relative to each other. Such a common drive motor may be connected, for example, to one of the guide rollers 44 and to the top guide roller 46 of conveyor belt portion 4B, or comprise two separate drive motors connected each to, respectively, the guide rollers 44 and 46 as set forth hereinabove.

FIG. 4 is a schematic elevational view of a second embodiment of apparatus for performing the heat-setting portions of the process illustrated in FIG. 1. This embodiment of the invention illustrates different positions for the several conveyor belts therein. The embodiment of FIG. 4 illustrates adjustments for the conveyor belts to allow for compensation for changes in length of the belts which may occur during operation thereof. One major difference between this embodiment and that of FIGS. 2 and 3 is that the bottom conveyor belt is designed in two separate sections, including an infeed conveyor belt 62 and a main bottom conveyor belt 64, each constructed of interlinked rollers in a manner similar to the roller construction 40, 40A described in connection with the embodiments of FIGS. 2 and 3. The infeed conveyor belt is illustrated in three different positions thereof. For the purpose of preparing a ridged batter topography on a batter-coated comestible, a first position 62 in which the infeed belt is in a relatively elevated horizontal position is required. A second position 62' in which the infeed conveyor belt is downwardly inclined into the hot oil cooking bath, and a third position 62" in which the infeed conveyor belt is in a relatively low, horizontal position are belt positions disclosed but not claimed. The second and third belt positions are illustrated to emphasize the flexibility that may be incorporated in the equipment design.

In other embodiments, the infeed conveyor belt can have a rod, mesh or screen surface and can be adjusted such that the battered food is partially or completely submerged in the hot oil cooking bath. Furthermore, adjustable slots 72 and 72" are illustrated for the left-hand portion of the infeed conveyor belt with slot 72 being used for adjustment purposes when the belt is in either position 62 or 62', and a slot 72" being utilized for adjustment when the belt is in position 62". The main bottom conveyor belt 64 also has a slot 80 for adjustment of the belt slack take-up, with the guide roller at the right hand side thereof being illustrated in two different positions 78, 78' relative to that slot.

The submerger conveyor belt 66 includes an adjustment at its right hand end wherein the end guide roller is shown in two different positions, 76 and 76', to illustrate its adjustable nature. Furthermore, the left hand portion of the submerger conveyor belt also includes an adjustment via a guide roller 82 and adjustment slot 84. In one position shown at 82, the guide roller is placed on top of the submerger belt 66, while in an alternative position of the submerger belt (shown in dashed lines), the guide roller is positioned at 82' beneath the submerger conveyor belt.

The main bottom conveyor belt 64 is driven via a mechanical connection 86 to a drive motor 88, and the submerger conveyor belt 66 is driven via a mechanical connection 90 to the same motor 88. The infeed conveyor belt 62 is driven via a mechanical connection 92 to a separate drive motor 94. The mechanical drives 86, 90 and 92 may take the form of drive belts, drive chains or equivalents thereof.

Accordingly, a single drive motor 88 is utilized to drive both the submerger conveyor belt 66 and the main bottom conveyor belt 64, while a second drive motor 92 drives the infeed conveyor belt 62, an arrangement which allows the speed of the infeed conveyor to be adjusted separately relative to the speeds of the other two conveyor belts. In a simplified version thereof, one drive motor could be utilized to drive all three conveyor belts.

While several embodiments of the present apparatus for preparing reconstitutable batter-coated comestibles have been described in detail herein, it should be apparent that many alternative arrangements and variations of the specific apparatus disclosed herein would be apparent to and within the purview of one of ordinary skill in the art.

What is claimed is:

1. An apparatus for continuously preparing a partially-fried batter coated comestible product, wherein said apparatus forms a ridged batter topography on said comestible with a first and a second frying stage, said apparatus comprising:
   (a) a hot cooking oil bath, said bath heated to at least partially heat-set a batter coating comestible during said first stage, and completely heat setting said batter during said second stage;
   (b) a first stage cooking means for supporting the batter coated comestible adjacent to surface of said oil bath to heat set the batter as gravitational forces cause the batter to droop from the comestible, said first stage having:
       (i) a plurality of support elements, said elements having a diameter of $\frac{1}{4}$ to $\frac{7}{8}$ inches and spaced apart from one another to define a droop opening that does not exceed $1\frac{1}{4}$ inches;
       (ii) means for transporting said support elements through said oil bath;
       (iii) means for adjusting the distance between said support elements and the surface of said oil bath, whereby the support elements support the comestible during the first frying stage to heat set the batter as it droops between said support elements,
   (c) a second stage cooking means for completely submerging said comestible below the surface of said oil bath to completely heat set the batter, said second stage having:
       (i) means for physically submerging said comestible below the surface of said oil bath;
       (ii) transport means for transporting said comestible through said oil bath to completely heat set the batter, said transport means also elevating said comestible to remove it from the oil bath after the batter is heat set.

2. An arrangement for continuously preparing a batter-coated comestible product having a ridged batter topography as claimed in claim 1, wherein the hot cooking oil is $\frac{1}{2}$ inches above the top of the support elements, each support element defining a bar diameter of $\frac{5}{8}$ inch with the support elements spaced $\frac{3}{4}$ inch apart.

3. An arrangement for continuously preparing a batter-coated comestible product having a ridged batter topography as claimed in claim 1, wherein said transport means further comprises a second conveyor belt means extending from said support elements downwardly into the hot oil bath to submerge the comestible product therein, after forming the ridged batter topography to provide for completely heat-setting the batter on the comestible product.

4. An arrangement for continuously preparing a batter-coated comestible product having a ridged batter topography as claimed in claim 1 or 3, said second conveyor belt means including a bottom conveyor belt and a top submerger belt to maintain the comestible products submerged in the hot oil bath.

5. An arrangement for continuously preparing a batter-coated comestible product having a ridged batter topography as claimed in claim 4, said bottom conveyor belt and top submerger belt being mechanically coupled to a common drive motor to drive both belts at the same speed, and an independent drive means for said support elements, whereby the support elements may be driven at a speed independently of the speed of said bottom and top submerger conveyor belts.

* * * * *